(12) United States Patent
Pan et al.

(10) Patent No.: US 10,389,678 B2
(45) Date of Patent: Aug. 20, 2019

(54) NOTIFICATION FRAMEWORK FOR SMART OBJECTS

(71) Applicant: Facebook, Inc., Menlo Park, CA (US)

(72) Inventors: Christopher Chun-Ning Pan, Seattle, WA (US); Francislav Penov, Kirkland, WA (US); Arthur Beatte, IV, Bothell, WA (US)

(73) Assignee: Facebook, Inc., Menlo Park, CA (US)

( * ) Notice: Subject to any disclaimer, the term of this patent is extended or adjusted under 35 U.S.C. 154(b) by 343 days.

(21) Appl. No.: 15/443,832

(22) Filed: Feb. 27, 2017

(65) Prior Publication Data

US 2018/0248834 A1    Aug. 30, 2018

(51) Int. Cl.
| | |
|---|---|
| *H04L 12/58* | (2006.01) |
| *H04W 4/80* | (2018.01) |
| *H04L 29/08* | (2006.01) |
| *G06Q 30/02* | (2012.01) |
| *G06Q 50/00* | (2012.01) |
| *H04W 4/70* | (2018.01) |

(52) U.S. Cl.
CPC ......... *H04L 51/32* (2013.01); *G06Q 30/0241* (2013.01); *G06Q 50/00* (2013.01); *G06Q 50/01* (2013.01); *H04L 67/20* (2013.01); *H04W 4/70* (2018.02); *H04W 4/80* (2018.02)

(58) Field of Classification Search
CPC ......... H04L 51/32; H04L 65/403; H04W 4/80
See application file for complete search history.

(56) References Cited

U.S. PATENT DOCUMENTS

2012/0150966 A1* 6/2012 Fan .................. G06Q 10/107
709/206
2012/0167137 A1* 6/2012 Wong ................ H04N 21/2743
725/38
2013/0097016 A1* 4/2013 Klish .................. G06Q 30/02
705/14.49

(Continued)

FOREIGN PATENT DOCUMENTS

EP     3032486 A1    6/2016
EP     3128477 A1    2/2017

OTHER PUBLICATIONS

EESR received from EPO for EP Patent Application No. 17187433.2-1216, Mar. 19, 2018.

(Continued)

*Primary Examiner* — Oanh Duong
(74) *Attorney, Agent, or Firm* — Baker Botts L.LP.

(57) ABSTRACT

Embodiments of a notification framework for smart objects (e.g., smart televisions) to deliver notifications to user devices are described. In one embodiment, a method includes a server receiving an event-registration request from a smart object. The event-registration request may include event information associated with an event associated with the smart object. In response to the request, the server may generate a code, associate the code with the event information, and send the code to the smart object. The smart object may then broadcast the code to the user device through, e.g., short-range wireless communication. The server may receive an information request from a user device that includes the code, and in response send the event information associated with the code to the user device.

20 Claims, 5 Drawing Sheets

(56) References Cited

U.S. PATENT DOCUMENTS

| | | | |
|---|---|---|---|
| 2013/0198656 A1* | 8/2013 | Jones | H04L 67/36 |
| | | | 715/758 |
| 2013/0210360 A1 | 8/2013 | Ljung et al. | |
| 2014/0207877 A1* | 7/2014 | Kandaswamy | H04L 51/32 |
| | | | 709/206 |
| 2014/0244751 A1* | 8/2014 | Tseng | H04N 21/26291 |
| | | | 709/204 |
| 2014/0244768 A1 | 8/2014 | Shuman | |
| 2014/0244770 A1 | 8/2014 | Kim | |
| 2014/0304381 A1 | 10/2014 | Savolainen et al. | |
| 2015/0186994 A1 | 7/2015 | He | |
| 2015/0348403 A1 | 12/2015 | Berelejis et al. | |
| 2016/0202672 A1 | 7/2016 | Park | |
| 2017/0005976 A1* | 1/2017 | Liang | G06Q 50/01 |
| 2017/0034108 A1* | 2/2017 | Fechete | H04L 51/32 |
| 2017/0048707 A1 | 2/2017 | Ortiz et al. | |

OTHER PUBLICATIONS

International Search Report and Written Opinion received for PCT Application No. PCT/US2017/019885, dated Nov. 23, 2017.

* cited by examiner

NOTIFICATION FRAMEWORK FOR SMART OBJECTS

TECHNICAL FIELD

This disclosure generally relates to a communication framework for smart objects.

BACKGROUND

Smart objects, also referred to as Internet of Things, connected devices, and smart devices, are physical objects with embedded electronics that allow them to send, receive, or exchange data with external systems. The physical object itself may be anything, such as appliances (e.g., washing machines, refrigerators, and coffee makers), entertainment devices (e.g., television, sound systems), wearable devices (e.g., watches, headphones), home devices (e.g., thermostats, light bulbs), vehicles, and buildings, among others without limitation. A smart object may be equipped with electronics and software that enable it to communicate with external systems. For example, a smart object may be capable of communicating wirelessly, such as through Wi-Fi, Bluetooth, near-field communication (NFC), infrared (IR), cellular, and/or other wireless communication technologies. A smart object may communicate through a network, such as a local area network, the Internet, or cellular-telephone network. Communications between a smart object and an external system may be direct (e.g., via mDNS, Bluetooth, or NFC) or indirect (e.g., through a local area network).

In the context of this application, a user device generally refers to a general computing device—such as a smartphone, tablet computer, laptop computer, desktop computer—that the user directly interfaces with. A user device may include input functionalities (e.g., touchscreen, keyboard, mouse, pointing device, microphone, camera, etc.) and output functionalities (e.g., touchscreen, display, speaker, etc.). A user device may also include functionality for wireless communication, such as Bluetooth communication, near-field communication (NFC), or infrared (IR) communication, and may be capable of connecting to a network, such as wireless local area networks (WLANs) or cellular-telephone network. A user device may also execute software applications, such as games, web browsers, or social-networking applications. With social-networking applications, users may connect, communicate, and share information with other users in their social networks.

SUMMARY OF PARTICULAR EMBODIMENTS

Smart objects may need to communicate with a user to, e.g., notify the user of certain events and/or solicit instructions from the user. For example, upon detecting an unauthorized entry, a smart security system may notify a user of the detected event and ask whether the police should be notified. The manner in which a smart object communicates with a user varies. A designer of a smart object typically implements its own proprietary communication system for handling communications between the smart object and user devices. For example, in order to communicate with a smart security system, a user may be required to install on his/her mobile device a proprietary software application designed by the smart security system. However, the time and cost for implementing such a communication system, which may also require back-end servers and infrastructure support, can be expensive and not within the expertise of, e.g., the designer of the smart object. Further, if notifications are handled by a proprietary application installed on the user's mobile device, the application may need to be running on the user's mobile device in order for it to detect and display notifications. However, such applications with limited and specific functionality may not normally be active or running, and it may not be desirable to have the application running since it would consume limited resources, such as battery, memory, and processing capacity. Thus, the user may not be made aware of a notification until he/she launches the application. However, by then the notification may no longer be timely, and the notification may be inconveniencing the user since the user presumably launched the application because he/she needed to use the smart object at that time.

Described herein is a notification framework that allows smart objects to use an existing system—such as a social-networking system—as a platform for sending notifications to and receiving actions/instructions from users. In other words, smart objects, rather than relying on their own proprietary servers and applications, may utilize the existing communication infrastructure of a social-networking system to communicate with users. For example, a smart object may send a notification via the social-networking server, and the notification may be displayed through a corresponding client-side application associated with the social-networking system. Since a social-networking application is more likely to be active or running on the user's device compared to a proprietary application of a smart object, users are more likely to be informed of and provided with the opportunity to act on a notification at a time that is convenient for the users, rather than being notified of an actionable event when launching the smart device's application at a time when the smart device is needed (e.g., installing firmware for a light bulb at night).

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a, optionally computer-implemented, method may comprise:
  receiving, by a server, an event-registration request from a smart object, the event-registration request including event information associated with an event associated with the smart object;

generating, by the server, a code in response to the event-registration request;

associating, by the server, the code with the event information;

sending, by the server, the code to the smart object;

receiving, by the server, an information request from a user device, the information request including the code; and sending, by the server, the event information associated with the code to the user device in response to the information request;

wherein the code is broadcast from the smart object to the user device through short-range wireless communication.

The smart object may be a television, thermostat, kitchen appliance, electrical outlet, light bulb, or vehicle.

The server may be associated with a social-networking system;
 a social-networking application associated with the social-networking system may be installed on the user device.

The information request may be generated by the social-networking application;
 the event information may be configured to be processed by the social-networking application.

The event information may be configured to cause the social-networking application to display a notification regarding the event.

In an embodiment according to the invention, a method, wherein the event-registration request from the smart object may include a first user identification specifying an intended recipient of the event information, wherein the information request from the user device may include a second user identification specifying a user of the user device, further may comprise:
 associating, by the server, the code with the first user identification; and
 determining, by the server, that the first user identification and the second user identification match.

In an embodiment according to the invention, a method may comprise:
 associating, by the server, the code with a criterion for sending the event information; and determining, by the server, that the criterion associated with code is satisfied based on the received information request.

The criterion may be based on: whether a time period associated with the event information is expired, whether the event information was sent prior to the receiving of the information request, whether an action in response to the event information was performed prior to the receiving of the information request, or whether the event information can be sent to multiple users.

The event information may include information associated with the smart object, information associated with the event, a URL to an Internet location where information associated with the event is stored, or an identification of an application associated with the smart object requesting permission.

The event information may solicit an action from a user of the user device.

In an embodiment according to the invention, a method may comprise:
 receiving, by the server, activity information from the user device, the activity information being associated with an action performed by a user of the user device in response to the event information.

In an embodiment according to the invention, a method may comprise:
 associating, by the server, the code with an event status based on the received activity information.

In an embodiment according to the invention, a method may comprise:
 sending, by the server, the activity information to the smart object.

In an embodiment according to the invention, a method may comprise:
 generating, by the server, a second code in response to the event-registration request; and
 associating, by the server, the second code with the event information;
 wherein the second code is used in communications between the server and the smart object;
 wherein the code is used in communications between the server and the user device.

The code may be derived from the second code.

The short-range wireless communication may use Near Field Communication (NFC), Bluetooth, mDNS, or Wi-Fi Direct technology.

In an embodiment according to the invention, one or more computer-readable non-transitory storage media may embody software that is operable when executed to cause a server to:
 receive an event-registration request from a smart object, the event-registration request including event information associated with an event associated with the smart object;
 generate a code in response to the event-registration request;
 associate the code with the event information;
 send the code to the smart object;
 receive an information request from a user device, the information request including the code; and
 send the event information associated with the code to the user device in response to the information request;
 wherein the code is broadcast from the smart object to the user device through short-range wireless communication.

The software may further operable when executed to cause the server to:
 generate a second code in response to the event-registration request; and
 associate the second code with the event information;
 wherein the second code is used in communications between the server and the smart object;
 wherein the code is used in communications between the server and the user device.

In an embodiment according to the invention, a server may comprise: one or more processors; and a memory coupled to the processors comprising instructions executable by the processors, the processors being operable when executing the instructions to:
 receive an event-registration request from a smart object, the event-registration request including event information associated with an event associated with the smart object;
 generate a code in response to the event-registration request;
 associate the code with the event information;
 send the code to the smart object;
 receive an information request from a user device, the information request including the code; and
 send the event information associated with the code to the user device in response to the information request;

wherein the code is broadcast from the smart object to the user device through short-range wireless communication.

The processors may further be operable when executing the instructions to:
generate a second code in response to the event-registration request; and associate the second code with the event information;
wherein the second code is used in communications between the server and the smart object;
wherein the code is used in communications between the server and the user device.

In an embodiment according to the invention, one or more computer-readable non-transitory storage media may embody software that is operable when executed to perform a method according to the invention or any of the above mentioned embodiments.

In an embodiment according to the invention, a system may comprise: one or more processors; and at least one memory coupled to the processors and comprising instructions executable by the processors, the processors operable when executing the instructions to perform a method according to the invention or any of the above mentioned embodiments.

In an embodiment according to the invention, a computer program product, preferably comprising a computer-readable non-transitory storage media, may be operable when executed on a data processing system to perform a method according to the invention or any of the above mentioned embodiments.

DESCRIPTION OF EXAMPLE EMBODIMENTS

In particular embodiments, a notification framework is provided that allows smart objects to send notifications to user devices through a communication system. This communication system may be a third-party system relative to the smart object. For example, the communication system may comprise a social-networking server and associated client-side social-networking software applications, and the smart object may be a smart television or household appliance that is otherwise unrelated to the social-networking system. In particular embodiments, a smart object may register notification events with the communication system, and the communication system may serve as a central hub that tracks and updates the event notifications and provide associated information to the user device and/or the smart object.

Figure 1:
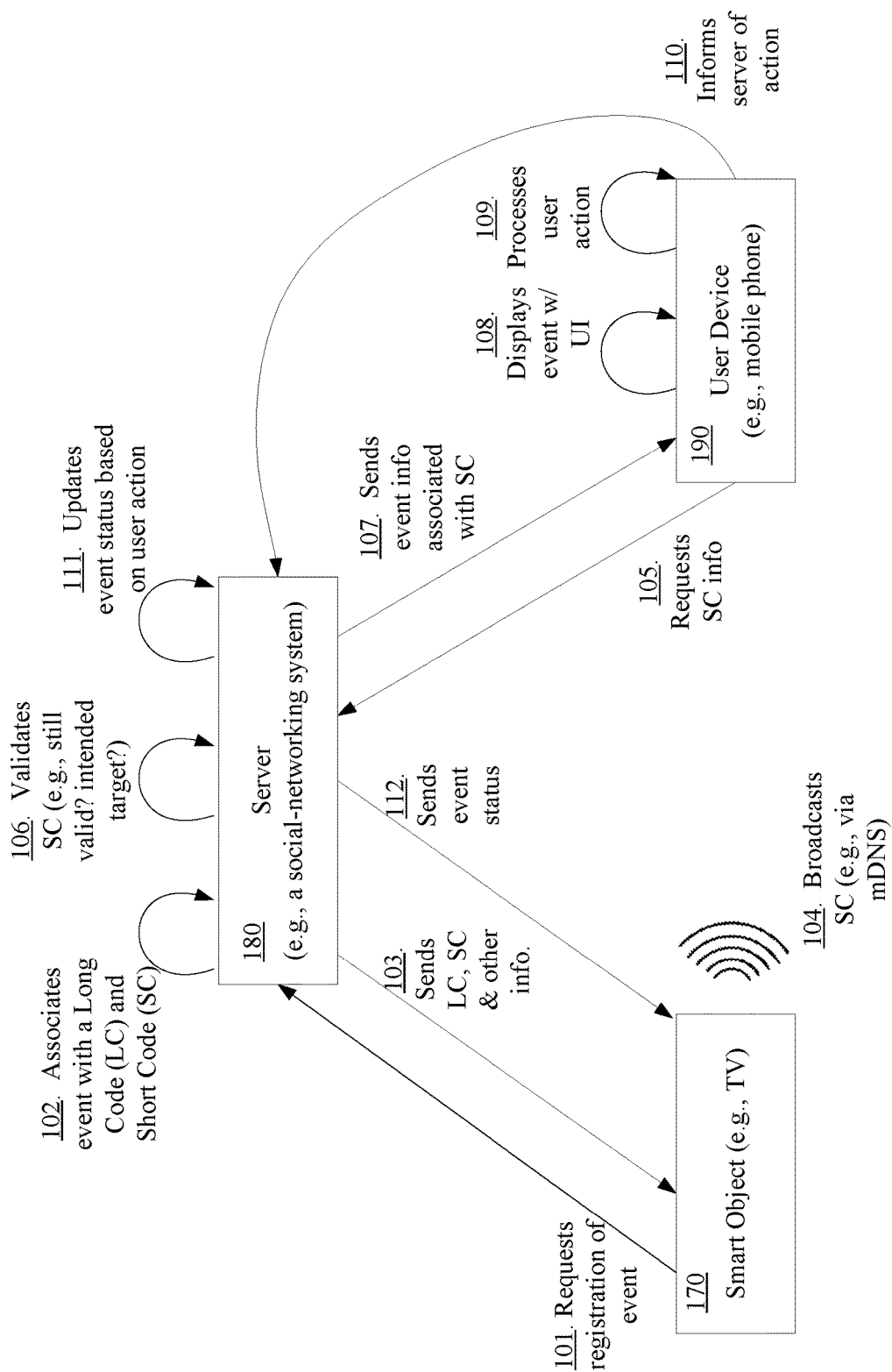
FIG. 1 illustrates an example notification framework through which actionable notifications from a smart object are communicated to a user device.

FIG. 1 illustrates an embodiment of a notification framework comprising a server 180 through which notifications from a smart object 170 are communicated to a user device 190. The smart object 170 may be, for example, a smart television, smart household appliance, or any other type of smart objects. The user device 190 may be, for example, a mobile phone, tablet, laptop, or any other type of computing device capable of communicating with the server. The server 180 may be, for example, associated with a social-networking system that communicates with an associated social-networking application installed on the user device 190.

Various events may trigger the smart object 170 to send a notification. For example, a smart lightbulb, upon detecting that it is past midnight or upon detecting a lack of movement, may wish to notify users in the house and ask whether the lightbulb may be powered off. As another example, a smart television, upon detecting a signal indicating that a particular product is being displayed in a commercial, may wish to send a notification to a viewer to provide purchasing options or additional details about the product.

In particular embodiments, when a smart object 170 wishes to send a notification, it may send an event-registration request to the server 180 (e.g., at 101 in FIG. 1) via, e.g., Wi-Fi or any other suitable communication channel. In particular embodiments, the event-registration request may include information pertaining to the event that is to be displayed to the user. For example, such information may include a message describing the event, soliciting a response or instruction from a user, providing available actionable options, and/or including a URL to information or control options hosted on a separate website. In particular embodiments, the event-registration request may include instructions relating to manners in which the event notification should be carried out. For example, the event-registration request may specify an event type (e.g., an informational or actionable event) and/or a notification type (e.g., the notification is to be pulled by the user, pushed to the user, displayed through a popup interface, or any other supported notification mechanism). As another example, the event-registration request may specify whether the notification is intended for a specific user(s) or any user. As yet another example, the event-registration may instruct the server 180 to apply any number of rules for managing the event notification, such as an expiration policy or timeframe, a re-send policy (e.g., if no user views or responds to a notification within a time frame), a maximum or minimum number of allowable viewers of the notification, a maximum or minimum number of actors who may respond to the notification, identities of allowed viewers and/or actors, and instructions on how user responses to a notification is to be handled. In particular embodiments, the smart object 170 may be integrated with a software development kit (SDK) provided by the server 180. The SDK, for example, may include the protocols, command codes, and/or APIs that enable the smart object 170 to communicate with the server 180.

In particular embodiments, upon receiving the event-registration request from the smart object 170, the server 180 may proceed with registering the event according the information provided in the request. In particular embodiments, the server 180 may associated a generated code with the event (e.g., at 102 in FIG. 1). The code may be used in subsequent communications to identify the event to which the communications pertain. In particular embodiments, the server 180 may generate a Long Code and a corresponding Short Code and associate the codes with the event information. In particular embodiments, the Long Code and Short Code may be related such that the server 180 is able to process a received Short Code and determine its corresponding Long Code. For example, in one embodiment Long Code=$f$(Short Code), where $f( )$ is a function or rule that would transform a Short Code into the Long Code. In particular embodiments, the Short Code may be a subset of the Long Code. For example, the Long Code may be 16 characters long (e.g., abcdefghijklmnop) and the Short Code may be the last 4 characters of the Long Code (e.g., mnop). As another example, the Short Code may be derived from the Long Code (e.g., the Short Code may be a hash code of the Long Code). In particular embodiments, the Long Code may be used in communications between the server 180 and the smart object 170, and the Short Code may be used in communications between the server 180 and the user device 190. For security purposes, in particular embodiments the Long Code may be kept private and known only to the server 180 and the smart object 170; the Short Code, on the other hand, may be made public (e.g., through broadcasting).

In particular embodiments, once the requested event has been registered and associated with a code, the server 180 may send the code to the smart object 170 (e.g., at 103 in FIG. 1). In the particular embodiments where a Long Code and Short Code are associated with the event, the server 180 may send both the Long Code and the Short Code to the smart object 170.

After receiving the Long Code and Short Code, the smart object 170 in particular embodiments may store the Long Code and/or the Short Code and broadcast the Short Code to local user devices (e.g., at 104 in FIG. 1). For example, the smart object 170 may broadcast the Short Code using short-range wireless communication, such as mDNS, Bonjour, NFC, Bluetooth, etc. One benefit of using short-range wireless communication is that the intended target audience can be limited to those who are physically close to the smart device. For example, a smart television may only be interested in sending notifications to those who are watching it, or a smart slow cooker may only be interested in notifying residents in the house. Another benefit of broadcasting the code is that certain notifications may not know or care who is being notified, so long as the person is nearby. In particular embodiments, the smart object 170 may utilize a broadcasting feature implemented by an SDK associated with the server 180 and the application running on the user device 190. In particular embodiments, the smart object 170 may broadcast the Short Code by opening a mDNS service with a predetermined name, and any user device 190 within communication range may listen for such a named service on the local network for the code. In particular embodiments, the smart object 170 may terminate broadcasting of the code after a predetermined time period, upon receiving an indication from the server 180 that a user device 190 has received and viewed or acted on the notification associated with the Short Code, or upon receiving a termination instruction from the server 180 as a result of certain rules being satisfied (e.g., the server 180 may have determined that the intended user has viewed the notification).

In particular embodiments, after receiving the code through the broadcast, the user device 190 may then use it to request the associated notification from the server 180 (e.g., at 105 in FIG. 1). In particular embodiments, the application on the user device 190 may cause the device to send an information request to the server 180. In particular embodiments, the information request may include the received Short Code, which may be used by the server 180 to identify the event notification of interest. The information request may also include additional information, such as a device identification and/or user identification, which may be used by the server 180 to determine whether the user device 190 or its user is the intended audience of the notification (if the notification is audience-specific). For example, the application running on the user device may require the user to login to his/her account (e.g., the user may be logged into a social-networking application) and therefore may send the user identification(s) associated with that user account.

In particular embodiments, upon receiving the information request from the user device 190, the server 180 may process the request, including validating the request and checking whether any rules associated with the requested notification is violated (e.g., at 106 in FIG. 1). In particular embodiments, upon receiving a Short Code, the server 180 may determine whether it is valid. For example, the server 180 may track the usage history of a Short Code and may be able to determine whether a Short Code has already been used (e.g., previously used by the same user or by a different user). A Short Code that has already been used may no longer be valid if it is designated for one-time use, but it may still be valid if the Short Code is designated for multiple uses. As another example, a Short Code may be anonymous, which means any user may use it; or it may be targeted, which means only designated users may use it. In one embodiment, the server 180 may check for identity match by, e.g., comparing the user identification included in the information request with one or more targeted user identifications associated with the Short Code. As yet another example of Short Code validation, the server 180 may check whether the Short Code has expired. As another example, the server 180 may try to determine whether a corresponding Long Code may be identified using the Short Code. This may be accomplished by, for example, applying the appropriate function or rules (e.g., $f(\ )$, as discussed above). In particular embodiments, the validation rules may be associated with the Long Code and/or event notification, in which case the server 180 may need to identify the Long Code and/or the associated event notifications in order to know which rules apply. In particular embodiments, if match is found, the server 180 may send an error message to the user device 190. On the other hand, if a corresponding Long Code is found, the server 180 may then access the corresponding notification event and check whether the corresponding rules (if any) are satisfied. For example, the server 180 may check whether the notification event associated with the code (e.g., Long Code/Short Code) has expired; whether the notification event is for one-time use and whether it has already been viewed or acted upon; whether the notification event allows for multiple consumption and whether it has already been viewed or acted upon; whether the requesting user is an intended or targeted user for the event notification; among others.

In particular embodiments, after validating the information request, the server 180 may send the event notification associated with the received code to the user device 190 (e.g., at 107 in FIG. 1). For example, the server 180 may send a message pertaining to the event and/or actionable options to the user device 190. In particular embodiments, the server 180 may also send additional information. For example, if the event notification is to be displayed or consumed by a particular application on the user device 190, the server 180 may also send an identification of the application and any associated permission requests, which may cause the user device 190 to seek permission (if needed) from the user and pass the event notification to the specified application for consumption. In particular embodiments, the server 180 may send information about the smart object 170 (e.g., an identification of the smart object 170, its status, etc.), a timestamp of the event notification, status of the event (e.g., whether anyone has acted upon the, updates relating to the event, etc.), a URL link, and other pertinent information. In particular embodiments, the event notification sent to the user device 190 may be displayed through the application associated with the server 180 (e.g., the social-networking application associated with the social-networking system). In particular embodiments, the event notification may be sent to the user using the user's contact information stored on the server 180. For example, if the server 180 is a social-networking system, the user who sent the information request may have an account with the social-networking system that may include contact information (e.g., email and/or SMS number) through which notifications may be sent.

In particular embodiments, the user device 190 may process the information received from the server 180 and output the appropriate notification (e.g., at 108 in FIG. 1). For example, the user device 190 may display a message pertaining to the event notification, output a sound, display a video, vibrate, and/or perform any other forms of output to notify the user. Some notifications may be informational (e.g., notifying the user that a smart washer has completed, or providing the user with a link to a product shown on TV, etc.), and other actionable notifications may solicit a user response (e.g., ask whether the user wishes to communicate with the smart object 170, as for permission to install a firmware update, etc.). In particular embodiments, the type of user interface used for displaying the notification may differ based on the notification type. For example, informational notifications may be displayed in a pop-up window. As another example, actionable notifications may be displayed natively through the application associated with the server 180 (e.g., social-networking application) in a user interface that allows user input (e.g., with checkboxes, an "allow" button, input text fields, etc.). As another example, the application may cause notifications to be displayed external to the application, such as in another application (e.g., the social-networking application may cause a notification with a URL link to be displayed in a browser application). As yet another example, the application associated with the server 180 (e.g., social-networking application) may seek user permission and cause another application associated with the smart object 170 to be launched. For instance, if the smart object 170 is a printer, the associated application may be a proprietary application developed for managing or controlling the printer. The printer application may provide the user with additional features suitable for viewing and/or responding to the notification.

In particular embodiments, the user device 190 may process the user's action in response to the notification (e.g., at 109 in FIG. 1). In particular embodiments, the application on the user device 190 may log the user's actions and/or store, at least temporarily in RAM, the user's response or instructions. For example, the application may be programmed to log whether the user has viewed or closed an informational notification. As another example, the application may be programmed to solicit a response from the user for an actionable notification and record the user's response. For instance, if an actionable notification is from a smart printer asking whether the latest firmware should be installed, the user may respond by clicking on either a "Yes" or a "No" button displayed in the notification.

In particular embodiments, after the user responds (e.g., by reading the notification or affirmatively providing instructions), the user device 190 may process the response according to the notification type and generate an appropriate message for the server 180 (e.g., at 110 in FIG. 1). In particular embodiments, the user device 190 may make a determination as to whether the user action should be sent to the server 180. For example, the user device 190 may not inform the server 180 of user actions if the notification is informational (e.g., a printer's print job has completed), but it may inform the server 180 of user actions if the informational notification requires confirmation that it has been read. As another example, user actions may be sent if the actions are in response to actionable notifications. In particular embodiments, the message to the server 180 may include indicators that represent the user's action. In particular embodiments, the message may also include the code associated with the event, such as the Short Code, which may be used by the server 180 to determine the notification event to which the received user action relates. In particular embodiments, the message may also include additional information, such as a user identifier and/or timestamps related to the user actions.

In particular embodiments, the server 180 may update the status of the event notification according to the user action indicators received from the user device 190 (e.g., at 111 in FIG. 1). In particular embodiments, the server 180 may process the code in the received message to identify the corresponding notification event. In particular embodiments where the Short Code is used, the server 180 may use the Short Code to determine the corresponding Long Code (e.g., by using the function $f( )$), and in turn use the Long Code to determine the corresponding notification event. In particular embodiments, the server 180 may perform rule-based verifications to determine whether the user action is valid. For example, the server 180 may check, e.g., whether the user action conforms with the allowable or expected actions of the notification event; whether the user action is performed by a trusted or targeted user (e.g., based on a received user identifier in the message); whether the user action is timely (e.g., based on timestamps in the message); whether the event notification has already been acted upon and whether subsequent actions are permitted; whether the smart object 170 sent subsequent updates relating to the event notification that would render the user action moot; among others. In particular embodiments, if the user action is not valid, the server 180 may send an error message to the user device 190. In particular embodiments, if the user action is valid, the server 180 may update the status of the notification event. For example, the status may reflect, e.g., that the notification has been read, the identity of the user who read the notification, the user's response to the notification, the number of times the notification has been read or responded to, and/or other relevant information to reflect the status of the event.

In particular embodiments, the server 180 may notify the smart object 170 of the updated status of the event (e.g., at 112 of FIG. 1). In particular embodiments, the status may be pulled by the smart object 170. For example, the smart object may periodically (e.g., after predetermined time intervals) pull the server 180 to check whether the status of the notification event has changed. The smart object 170 in this case may send a pull request including the code (e.g., Long or Short Code) associated with the notification event so that the server 180 may identify the notification event of interest. In particular embodiments, the status may be pushed by the server 180 to the smart object 170 periodically or upon a status update. In particular embodiments, the status information sent to the smart object 170 may, for example, indicate that the notification has been read, or indicate the user responses to an actionable notification. In particular embodiments, the server 180 may push the status information along with the code (e.g., Short or Long Code) associated with the notification event. The smart object 170, upon receiving the status information, may perform any suitable action. For example, the smart object 170 may identify the event notification associated with the code and determine how to process the status information. For example, if the event notification is informational, the smart object 170 may ignore the status information. As another example, if the smart object 170 is waiting for confirmation that the informational event notification has been read, it may then remove the event notification from its pending queue so that no follow-up notification would be sent. In particular embodiments where the notification event solicits a user response, the smart object 170 may process the received status information to determine how the user responded and act accordingly. For example, if the notification asked the user whether firmware may be installed, the smart object 170 may proceed with the installation upon receiving status information indicating an agreement by the user. If, on the other hand, the user response is negative, the smart object 170 may not install the firmware and may seek approval again at a later time.

In particular embodiments, the notification framework may also be used to simplify the process for a user device to establish communication or pair with a smart object. For example, one type of login flow may involve a smart object (e.g., television) displaying a generated code on a screen and asking the user to enter the displayed code on his user device to confirm the communication link. Rather than requiring a user to manually enter the code, particular embodiments of the notification framework may allow a smart object to automatically broadcast the code to nearby devices (e.g., using mDNS). Upon detecting the broadcast code, the user device in particular embodiments may display the code and ask the user to confirm whether the code displayed on his user device matches the code that is shown on the screen of the smart object. If the codes match, the user may simply click on a confirmation button to complete the login process without having to manually enter the code. Thus, confirmation of the authentication code may occur on the back-end without requiring manual entry of the code. In another embodiment where the smart object is incapable of displaying the code (e.g., it may be a lightbulb) or if no visual code confirmation by the user is required, the user device may, upon detecting a broadcast from the smart object, simply ask the user whether he/she wishes to connect to the smart object. In this example, the user would not be required to manually enter any code during the login process.

Figure 2:
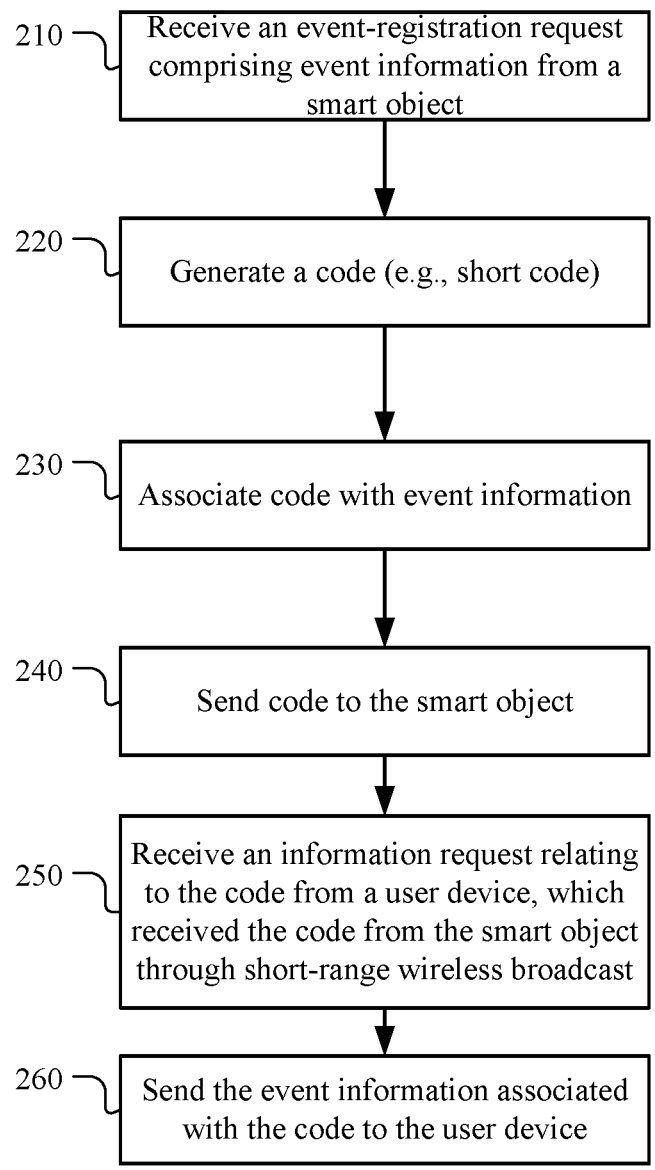
FIG. 2 illustrates an example method for delivering notifications from a smart object to a user device.

FIG. 2 illustrates an example method 200 for delivering notifications from a smart object to a user device. The method may begin at step 210, where a server (e.g., a social-networking server associated with a social-networking system) may receive an event-registration request from a smart object (e.g., a television, thermostat, kitchen appliance, electrical outlet, light bulb, or vehicle). In particular embodiments, the event-registration request may include event information associated with an event associated with the smart object. For example, the event information may include, e.g., information associated with the smart object, information associated with the event, a URL to an Internet location where information associated with the event is stored, or an identification of an application associated with the smart object requesting permission. In particular embodiments, the event information may solicit an action from a user of the user device (e.g., an actionable notification).

At step 220, the server may generate a code in response to the event-registration request. In particular embodiments, the server may also generate a second code in response to the event-registration request and associate the second code with the event information. For example, the code and the second code may be the Short Code and Long Code, respectively, as discussed above.

At step 230, the server may associate the code with the event information. In particular embodiments, the code and/or the event information may be associated with one or more criteria or rules for sending the event information.

At step 240, the server may send the code to the smart object. In particular embodiments, the smart object may store the code at least temporarily in memory. In particular embodiments where a Long Code and Short Code are sent, the smart object may use the Long Code to communicate with the server and broadcast the Short Code to nearby user devices using, e.g., short-range wireless communication.

At step 250, the server may receive an information request from a user device. In particular embodiments, a social-networking application associated with the social-networking system may be installed on the user device. In particular embodiments, the information request may be generated by the social-networking application. In particular embodiments, the information request may include the code, which may have been broadcast from the smart object to the user device through, e.g., short-range wireless communication (e.g., mDNS). In particular embodiments, the event-registration request from the smart object may include a first user identification (e.g., a target user) specifying an intended recipient of the evert information, and the server may associate the code with the first user identification. Upon receiving the information request, which in particular embodiments may include a second user identification specifying a user of the user device, the server may determine whether the first user identification (e.g., the target user) and the second user identification match. A matching identity may indicate that the user is allowed to consume (e.g., view or act upon) the event notification, and a non-matching identity may indicate that the user is not allowed to consume the event notification. In particular embodiments where one or more criteria are associated with the code or event information, the server may determine whether the criteria are satisfied based on the received information request. For example, the server may determine, e.g., whether a time period associated with the event information is expired, whether the event information was sent prior to the receiving of the information request (e.g., it may have been consumed by another user), whether an action in response to the event information was performed prior to the receiving of the information request, or whether the event information can be sent to multiple users, etc.

At step 260, the server may send the event information associated with the code to the user device in response to the information request. In particular embodiments, the event information may be processed by a social-networking application installed on the user device. In particular embodiments, the event information may be configured to cause the social-networking application to display a notification regarding the event. In particular embodiments where the event information is an actionable notification, the server may receive activity information from the user device associated with an action performed by a user of the user device in response to the event information. In particular embodiments, the server may, based on the received activity information, associate an event status with the code and/or the corresponding notification information. In particular embodiments, the server may send the activity information to the smart object.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for delivering notifications from a smart object to a user device, including the particular steps of the method of FIG. 2, this disclosure contemplates any suitable method for delivering notifications from a smart object to a user device, including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
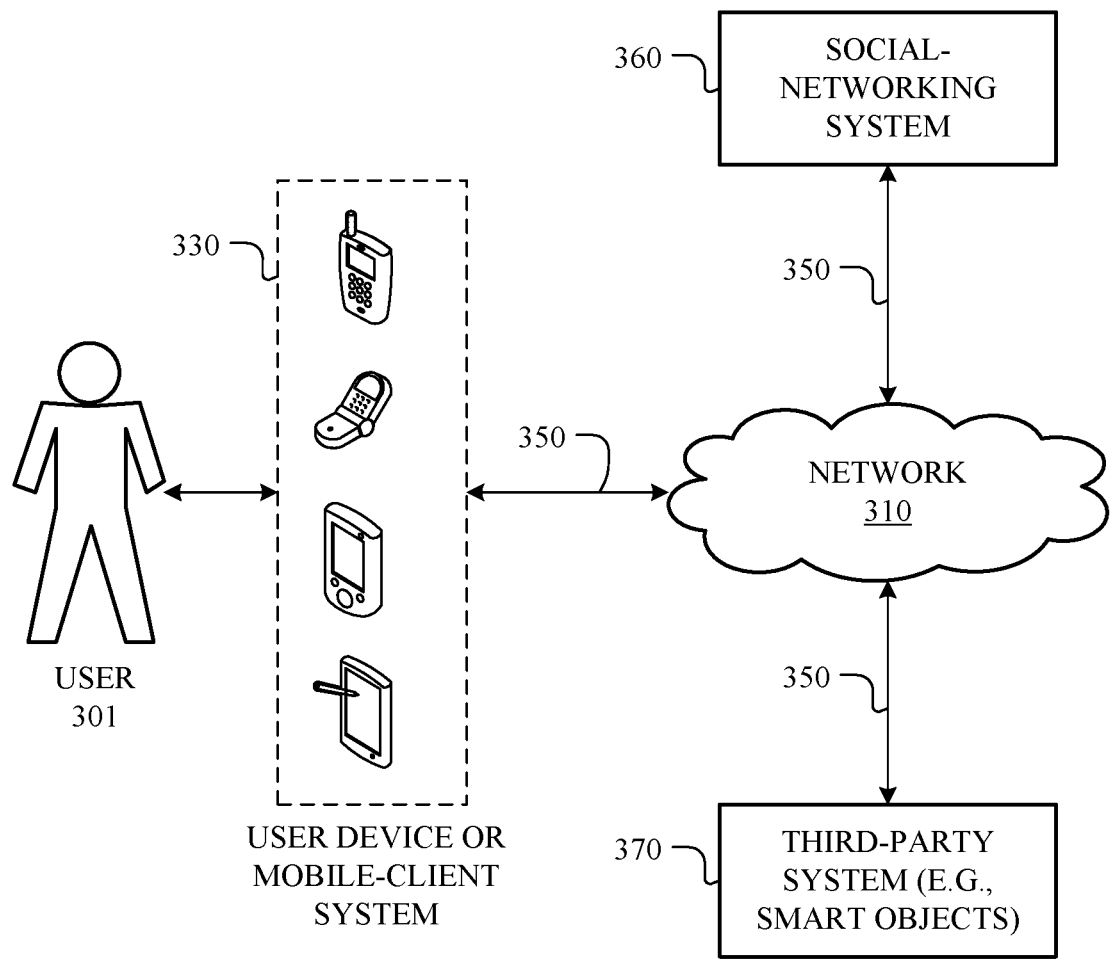
FIG. 3 illustrates an example network environment associated with a social-networking system.

FIG. 3 illustrates an example network environment 300 associated with a social-networking system. Network environment 300 includes a user 301, a client system 330, a social-networking system 360, and a third-party system 370 connected to each other by a network 310. Although FIG. 3 illustrates a particular arrangement of user 301, client system 330, social-networking system 360, third-party system 370 (e.g., smart objects), and network 310, this disclosure contemplates any suitable arrangement of user 301, client system 330, social-networking system 360, third-party system 370, and network 310. As an example and not by way of limitation, two or more of client system 330, social-networking system 360, and third-party system 370 may be connected to each other directly, bypassing network 310. As another example, two or more of client system 330, social-networking system 360, and third-party system 370 may be physically or logically co-located with each other in whole or in part. Moreover, although FIG. 3 illustrates a particular number of users 301, client systems 330, social-networking systems 360, third-party systems 370, and networks 310, this disclosure contemplates any suitable number of users 301, client systems 330, social-networking systems 360, third-party systems 370, and networks 310. As an example and not by way of limitation, network environment 300 may include multiple users 301, client system 330, social-networking systems 360, third-party systems 370, and networks 310.

In particular embodiments, user 301 may be an individual (human user), an entity (e.g., an enterprise, business, or third-party application), or a group (e.g., of individuals or entities) that interacts or communicates with or over social-networking system 360. In particular embodiments, social-networking system 360 may be a network-addressable computing system hosting an online social network. Social-networking system 360 may generate, store, receive, and send social-networking data, such as, for example, user-profile data, concept-profile data, social-graph information, or other suitable data related to the online social network. Social-networking system 360 may be accessed by the other components of network environment 300 either directly or via network 310. In particular embodiments, social-networking system 360 may include an authorization server (or other suitable component(s)) that allows users 301 to opt in to or opt out of having their actions logged by social-networking system 360 or shared with other systems (e.g., third-party systems 370), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 370 may be a network-addressable smart object. Third-party system 370 may generate, store, receive, and send information pertaining to an event notification, such as, for example, a message describing the event, actionable options for the user, instructions for the server on how to manage the event notification (e.g., criteria and rules), etc. Third-party system 370 may be accessed by the other components of network environment 300 either directly or via network 310. In particular embodiments, one or more users 301 may use one or more client systems 330 to access, send data to, and receive data from social-networking system 360 or third-party system 370. Client system 330 may access social-networking system 360 or third-party system 370 directly, via network 310, or via a third-party system. As an example and not by way of limitation, client system 330 may access third-party system 370 via social-networking system 360. Client system 330 may be any suitable computing device, such as, for example, a personal computer, a laptop computer, a cellular telephone, a smartphone, a tablet computer, or an augmented/virtual reality device.

This disclosure contemplates any suitable network 310. As an example and not by way of limitation, one or more portions of network 310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 310 may include one or more networks 310.

Links 350 may connect client system 330, social-networking system 360, and third-party system 370 to communication network 310 or to each other. This disclosure contemplates any suitable links 350. In particular embodiments, one or more links 350 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 350, or a combination of two or more such links 350. Links 350 need not necessarily be the same throughout network environment 300. One or more first links 350 may differ in one or more respects from one or more second links 350.

Figure 4:
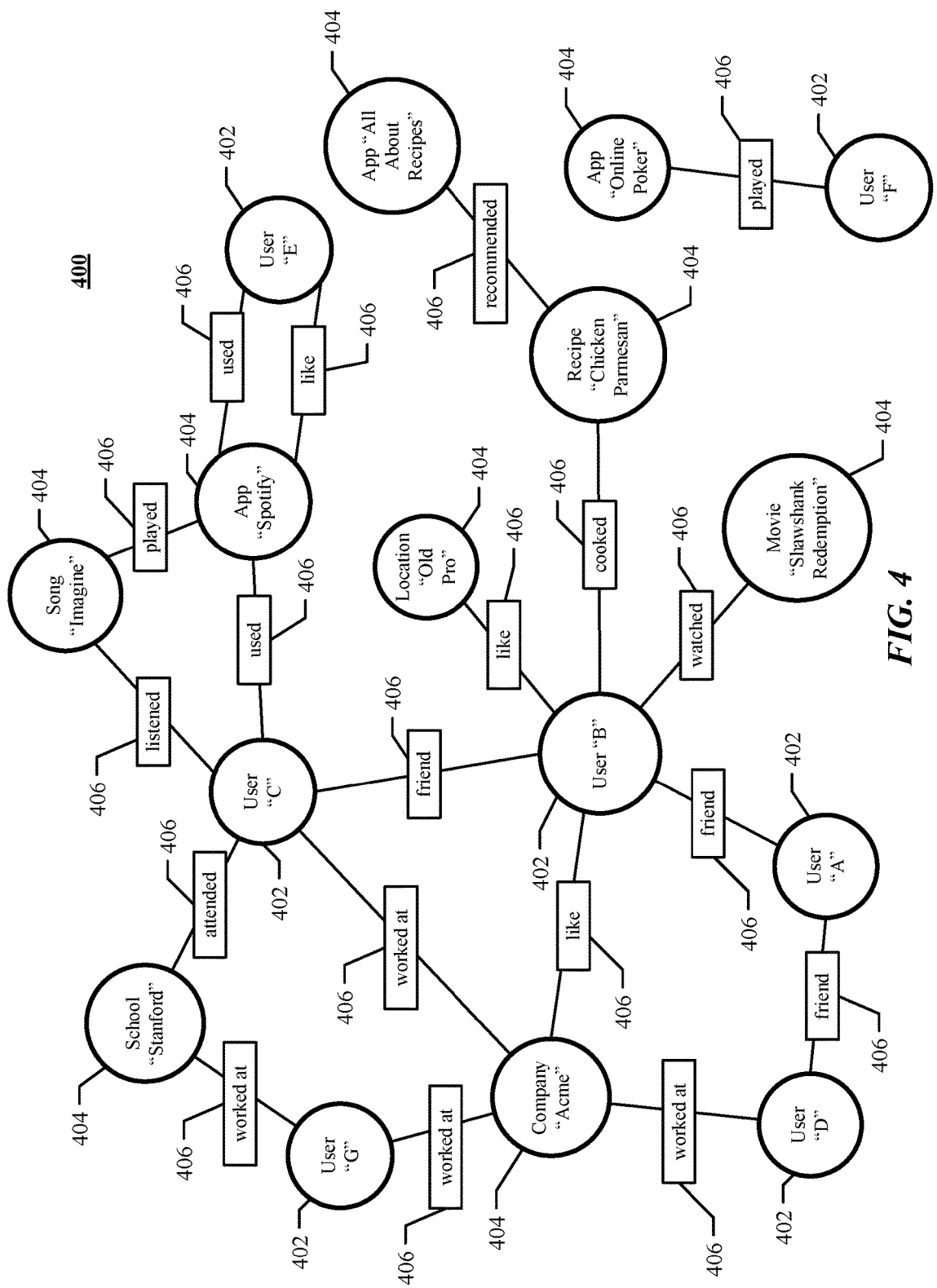
FIG. 4 illustrates an example social graph.

FIG. 4 illustrates example social graph 400. In particular embodiments, social-networking system 360 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 360, client system 330, or third-party system 370 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 360. As an example and not by way of limitation, a user may be an individual (human user), an entity (e.g., an enterprise, business, or third-party application), or a group (e.g., of individuals or entities) that interacts or communicates with or over social-networking system 360. In particular embodiments, when a user registers for an account with social-networking system 360, social-networking system 360 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 360. In particular embodiments, a user node 402 may be associated with information provided by a user or information gathered by various systems, including social-networking system 360. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages.

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 360 or a third-party website associated with a web-application server); an entity (such as, for example, a person, business, group, sports team, or celebrity); a resource (such as, for example, an audio file, video file, digital photo, text file, structured document, or application) which may be located within social-networking system 360 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 404 may be associated with information of a concept provided by a user or information gathered by various systems, including social-networking system 360. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more webpages.

In particular embodiments, a node in social graph 400 may represent or be represented by a webpage (which may be referred to as a "profile page"). Profile pages may be hosted by or accessible to social-networking system 360. Profile pages may also be hosted on third-party websites associated with a third-party system 370. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 370. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 330 to send to social-networking system 360 a message indicating the user's action. In response to the message, social-networking system 360 may create an edge (e.g., a check-in-type edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 360 may send a "friend request" to the second user. If the second user confirms the "friend request," social-networking system 360 may create an edge 406 connecting the first user's user node 402 to the second user's user node 402 in social graph 400 and store edge 406 as social-graph information in one or more of data stores 364. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 360 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 360 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 360 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 360 may create an edge 406 between a user node 402 and a concept node 404 in social graph 400. As an example and not by way of limitation, a user viewing a concept-profile page (such as, for example, by using a web browser or a special-purpose application hosted by the user's client system 330) may indicate that he or she likes the concept represented by the concept node 404 by clicking or selecting a "Like" icon, which may cause the user's client system 330 to send to social-networking system 360 a message indicating the user's liking of the concept associated with the concept-profile page. In response to the message, social-networking system 360 may create an edge 406 between user node 402 associated with the user and concept node 404, as illustrated by "like" edge 406 between the user and concept node 404. In particular embodiments, social-networking system 360 may store an edge 406 in one or more data stores. In particular embodiments, an edge 406 may be automatically formed by social-networking system 360 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Figure 5:
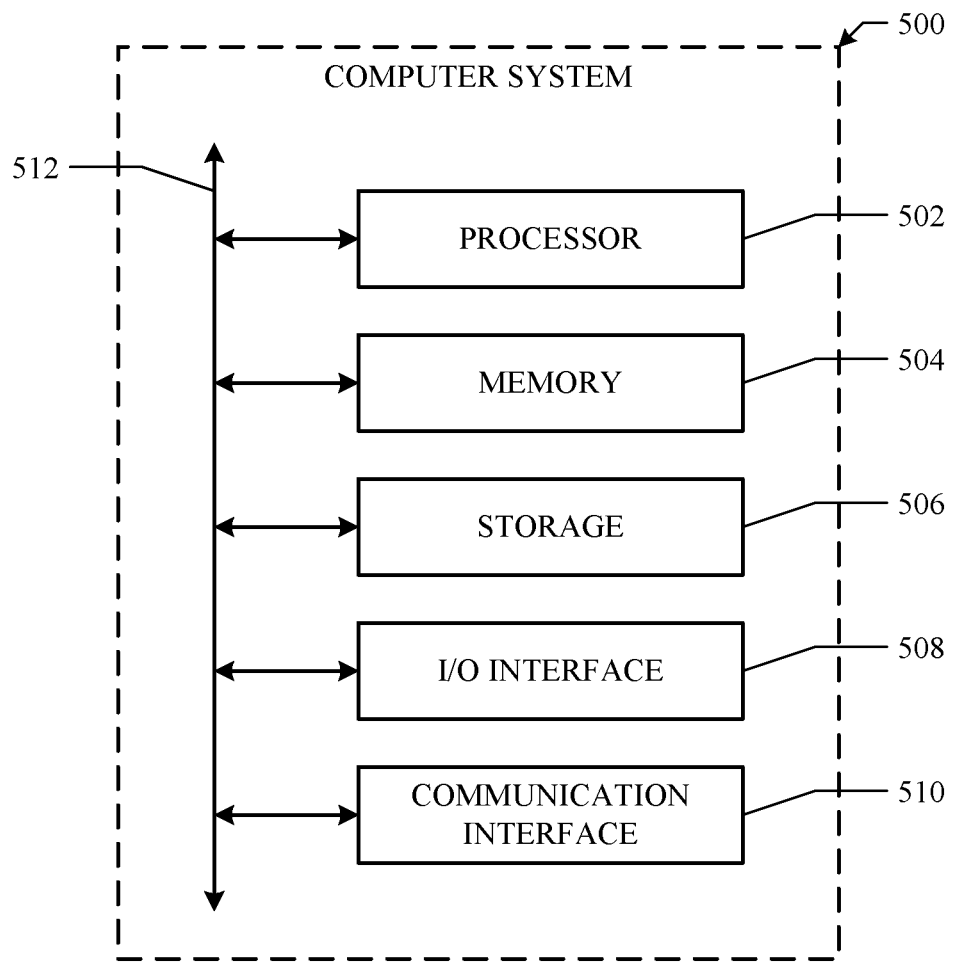
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   receiving, by a server, an event-registration request from a smart object, the event-registration request including event information associated with an event associated with the smart object;
   generating, by the server, a code in response to the event-registration request;
   associating, by the server, the code with the event information;
   sending, by the server, the code to the smart object;
   receiving, by the server, an information request from a user device, the information request including the code; and
   sending, by the server, the event information associated with the code to the user device in response to the information request;
   wherein the code is broadcast from the smart object to the user device through short-range wireless communication.

2. The method of claim 1,
   wherein the smart object is a television, thermostat, kitchen appliance, electrical outlet, light bulb, or vehicle.

3. The method of claim 1,
   wherein the server is associated with a social-networking system;
   wherein a social-networking application associated with the social-networking system is installed on the user device.

4. The method of claim 3,
   wherein the information request is generated by the social-networking application;
   wherein the event information is configured to be processed by the social-networking application.

5. The method of claim 3,
   wherein the event information is configured to cause the social-networking application to display a notification regarding the event.

6. The method of claim 1, wherein the event-registration request from the smart object includes a first user identification specifying an intended recipient of the event information, wherein the information request from the user device includes a second user identification specifying a user of the user device, further comprising:
   associating, by the server, the code with the first user identification; and determining, by the server, that the first user identification and the second user identification match.

7. The method of claim 1, further comprising:
associating, by the server, the code with a criterion for sending the event information; and
determining, by the server, that the criterion associated with code is satisfied based on the received information request.

8. The method of claim 7, wherein the criterion is based on: whether a time period associated with the event information is expired, whether the event information was sent prior to the receiving of the information request, whether an action in response to the event information was performed prior to the receiving of the information request, or whether the event information can be sent to multiple users.

9. The method of claim 1, wherein the event information includes information associated with the smart object, information associated with the event, a URL to an Internet location where information associated with the event is stored, or an identification of an application associated with the smart object requesting permission.

10. The method of claim 1, wherein the event information solicits an action from a user of the user device.

11. The method of claim 1, further comprising:
receiving, by the server, activity information from the user device, the activity information being associated with an action performed by a user of the user device in response to the event information.

12. The method of claim 11, further comprising:
associating, by the server, the code with an event status based on the received activity information.

13. The method of claim 11, further comprising:
sending, by the server, the activity information to the smart object.

14. The method of claim 1, further comprising:
generating, by the server, a second code in response to the event-registration request; and
associating, by the server, the second code with the event information;
wherein the second code is used in communications between the server and the smart object;
wherein the code is used in communications between the server and the user device.

15. The method of claim 14, wherein the code is derived from the second code.

16. The method of claim 1, wherein the short-range wireless communication uses Near Field Communication (NFC), Bluetooth, mDNS, or Wi-Fi Direct technology.

17. One or more computer-readable non-transitory storage media embodying software that is operable when executed to cause a server to:

receive an event-registration request from a smart object, the event-registration request including event information associated with an event associated with the smart object;
generate a code in response to the event-registration request;
associate the code with the event information;
send the code to the smart object;
receive an information request from a user device, the information request including the code; and
send the event information associated with the code to the user device in response to the information request;
wherein the code is broadcast from the smart object to the user device through short-range wireless communication.

18. The media of claim 17, wherein the software is further operable when executed to cause the server to:
generate a second code in response to the event-registration request; and
associate the second code with the event information;
wherein the second code is used in communications between the server and the smart object;
wherein the code is used in communications between the server and the user device.

19. A server comprising: one or more processors; and a memory coupled to the processors comprising instructions executable by the processors, the processors being operable when executing the instructions to:
receive an event-registration request from a smart object, the event-registration request including event information associated with an event associated with the smart object;
generate a code in response to the event-registration request;
associate the code with the event information;
send the code to the smart object;
receive an information request from a user device, the information request including the code; and
send the event information associated with the code to the user device in response to the information request;
wherein the code is broadcast from the smart object to the user device through short-range wireless communication.

20. The server of claim 19, wherein the processors are further operable when executing the instructions to:
generate a second code in response to the event-registration request; and
associate the second code with the event information;
wherein the second code is used in communications between the server and the smart object;
wherein the code is used in communications between the server and the user device.

* * * * *